United States Patent
Hultin et al.

(10) Patent No.: US 6,826,464 B2
(45) Date of Patent: Nov. 30, 2004

(54) METHOD AND DEVICE FOR PROCESS EVALUATION WHERE A SAFETY DEVICE IN A VEHICLE HAS NOT TRIGGERED

(75) Inventors: Magnus Hultin, Onsala (SE); Glenn Johansson, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/604,672

(22) Filed: Aug. 8, 2003

(65) Prior Publication Data

US 2004/0122571 A1 Jun. 24, 2004

Related U.S. Application Data

(63) Continuation of application No. PCT/SE02/00223, filed on Feb. 8, 2002.

(30) Foreign Application Priority Data

Feb. 8, 2001 (SE) ............................................. 0100394

(51) Int. Cl.⁷ ............................................. G06F 19/00
(52) U.S. Cl. ............................. 701/29; 701/35; 701/45; 280/735; 280/728.1; 714/5; 714/23
(58) Field of Search ............................. 701/29, 35, 45, 701/46, 76; 180/268, 271, 282; 280/735, 806, 807, 728.1, 734, 730.1; 714/5, 23; 307/9.1

(56) References Cited

U.S. PATENT DOCUMENTS

| | | | |
|---|---|---|---|
| 5,276,619 A | 1/1994 | Ohara et al. | 364/424.04 |
| 5,416,360 A | 5/1995 | Huber et al. | 307/10.1 |
| 6,007,094 A * | 12/1999 | Hosoda | 280/735 |
| 6,167,344 A * | 12/2000 | Fackler et al. | 701/115 |
| 6,170,864 B1 * | 1/2001 | Fujita et al. | 280/735 |
| 6,196,578 B1 * | 3/2001 | Iyoda | 280/735 |

FOREIGN PATENT DOCUMENTS

| | | | |
|---|---|---|---|
| JP | 1164649 | 9/1989 | |
| JP | 10167127 A * | 6/1998 | B62D/41/00 |

* cited by examiner

Primary Examiner—Thomas C. Black
Assistant Examiner—Tuan C To
(74) Attorney, Agent, or Firm—Novak Druce LLP

(57) ABSTRACT

Method and arrangement for subsequent analysis of processes in a motor vehicle where a safety device in the vehicle has not triggered and includes a control device for the safety device and a sensor for detection of processes which can result in that the safety device is triggered if a first parameter exceeds an upper limit. A first memory is included in which parameters regarding the operation of the vehicle are stored when the first parameter exceeds a lower limit, and a second memory to which the parameters are transmitted if the safety device is triggered. The device includes means for transmitting the parameters from the first memory to the second memory if the first parameter exceeds the lower limit during a certain time period and the amount of data in the first memory exceeds a predetermined limit.

8 Claims, 3 Drawing Sheets

METHOD AND DEVICE FOR PROCESS EVALUATION WHERE A SAFETY DEVICE IN A VEHICLE HAS NOT TRIGGERED

CROSS REFERENCE TO RELATED APPLICATIONS

The present application is a continuation patent application of International Application No. PCT/SE02/00223 filed Feb. 8, 2002 which was published in English pursuant to Article 21(2) of the Patent Cooperation Treaty, and which claims priority to Swedish Application No. 0100394-6 filed Feb. 8, 2001. Both applications are expressly incorporated herein by reference in their entireties.

BACKGROUND OF INVENTION

1. Technical Field

The present invention relates to a device and a method that enables a subsequent evaluation of a process in a motor vehicle where a safety device in the vehicle, for example an airbag, has not triggered. The invention is particularly intended for use in connection with airbags provided in trucks, but may also be applied in other types of motor vehicles and to other types of safety devices.

2. Background of the Invention

Many types of motor vehicles, for example trucks, are provided with various types of safety devices, such as, for example, airbags, which are triggered by means of control equipment in the event of certain types of specified processes or occurrences, or when one or several parameters exceed a certain threshold value which has been set beforehand.

In order to enable a subsequent evaluation of what has happened in a vehicle when a safety device has triggered, the control equipment for the safety devices are often provided with the capacity of storing a number of different parameters during such a process, such as, for example during a collision. One drawback related to such equipment is that they do not provide the opportunity to analyze what has happened in connection with a process where the safety device has not triggered, even if the vehicle has been in a situation where the safety device has come close to being triggered, or perhaps where it should have been triggered.

If a safety device in a vehicle has not triggered when the vehicle has been involved in a collision or some other situation where the driver believes that the safety device should have triggered, today's known devices offer no possibility for the manufacturer to evaluate what has occurred, and thus to understand the reason for why the safety device has not triggered. Such an evaluation would result in considerably improved possibilities to develop the safety devices further, and to assist the vehicle's driver in understanding why the safety device has not triggered.

One possibility to obtain information of what has happened at a certain time, irrespective of whether a safety device has triggered or not, is provided by means of so-called data logging systems. Known systems of this type, however, require considerable space, which, on account of the limited amount of space that is available for placing additional equipment in today's vehicles, makes it difficult to install such systems. Moreover, data logging systems are comparatively expensive, and in most cases do not offer the kind of resolution of collected data that is desirable in order to make it possible to analyze a process of the type in question with the desired accuracy. Moreover, the data that is collected by means of data logging systems is mostly of a nature that is focused on the behavior of the driver, not data, that makes it possible to evaluate why a safety device has not triggered.

SUMMARY OF INVENTION

Thus, there is a demand for equipment that enables a subsequent analysis of what has happened when a safety device in a vehicle has not triggered. One further desired feature regarding such equipment is that it can be easily integrated into existing equipment so that it does not take up too much space in the vehicle.

The present invention meets this desire by means of the fact that it provides a device for use in a motor vehicle that enables subsequent analysis of processes where a safety device in the vehicle has not triggered. The invention comprises (includes, but is not limited to) a control device for a safety device, and a sensor for the detection of processes and occurrences that can result in a safety device being triggered if a first parameter exceeds an upper limit. The invention also comprises a first memory in which parameters regarding the operation of the vehicle are stored when the first parameter exceeds a lower limit. A second memory is provided and to which the parameters are transmitted if the safety device is triggered. Furthermore, the invention comprises means for transmitting the parameters from the first memory to the second memory if the first parameter exceeds the lower limit during a certain time period and the amount of data in the first memory exceeds a predetermined limit.

Due to the fact that the invention provides the possibility to utilize the existing control device for the safety device in question, there is no demand for any additional space for installing the device in the vehicle. Moreover, this results in a device that, according to the invention, can be integrated into the vehicle in an economical manner and also be installed in existing vehicles by means of an exchange of the control unit. Furthermore, seeing that the invention utilizes essentially existing components, the cost for a device provided according to the invention can be kept low.

The invention also comprises methods of utilization of devices configured according to the structural teachings above.

BRIEF DESCRIPTION OF DRAWINGS

The invention will be explained in further detail below, with reference to the enclosed drawings, in which.

DETAILED DESCRIPTION

Figure 1:
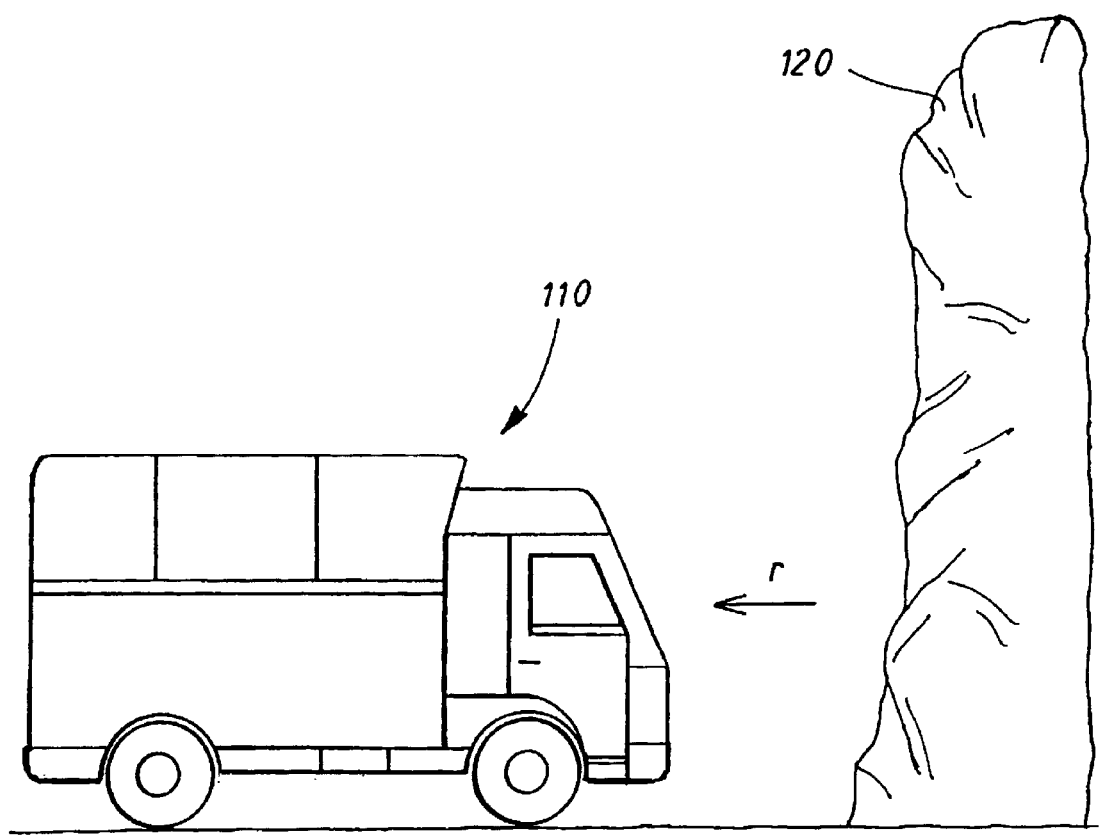
FIG. 1 exemplarily represents a collision process or occurrence.

FIG. 1 shows an example of a collision process. A truck 110 is approaching and hits a solid object 120 under the influence of a certain retardation r. The vehicle 110 is equipped with an airbag that is connected to control equipment which, among other things, controls whether the airbag shall trigger or not, on the basis of a number of parameters which are continuously measured during the operation. If, for example, the retardation during a certain predetermined time period amounts to a value which exceeds a predetermined threshold value, the airbag will trigger, otherwise not.

Figure 2:
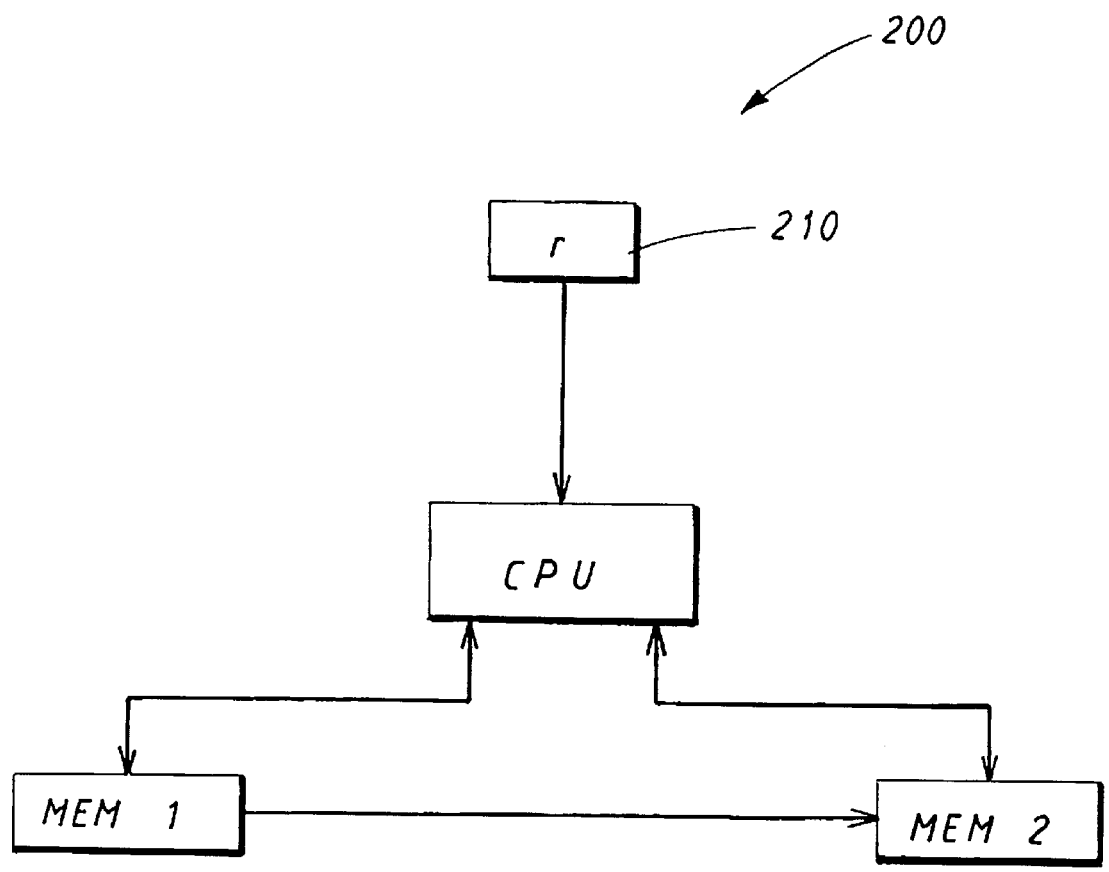
FIG. 2 schematically represents a control unit and process for a safety device in a vehicle.

FIG. 2 shows an example of a control unit 200 for an airbag, a so-called ECU, Electronic Control Unit. The ECU comprises, among other things, a sensor 210 which can measure retardation/deceleration, r, exemplarily in the form of an accelerometer. The ECU can also comprise other sensors for other parameters, $P_1$, $P_2$, $P_3$ ... $P_N$, which, however, are not shown in the drawing. The number of sensors, and thus the number of parameters, can vary between various types of vehicles.

The accelerometer 210 transmits its values to a processor, a CPU, which controls whether these values exceed the threshold/thresholds which is/are required in order for the airbag to trigger.

The control unit 200 also comprises two memories, illustrated in FIG. 2 and referred to as MEM 1 and MEM 2, in which the parameters that the sensor 210 measures can be stored. The function of these memories will be explained in greater detail below, in connection with FIG. 3.

Figure 3A:
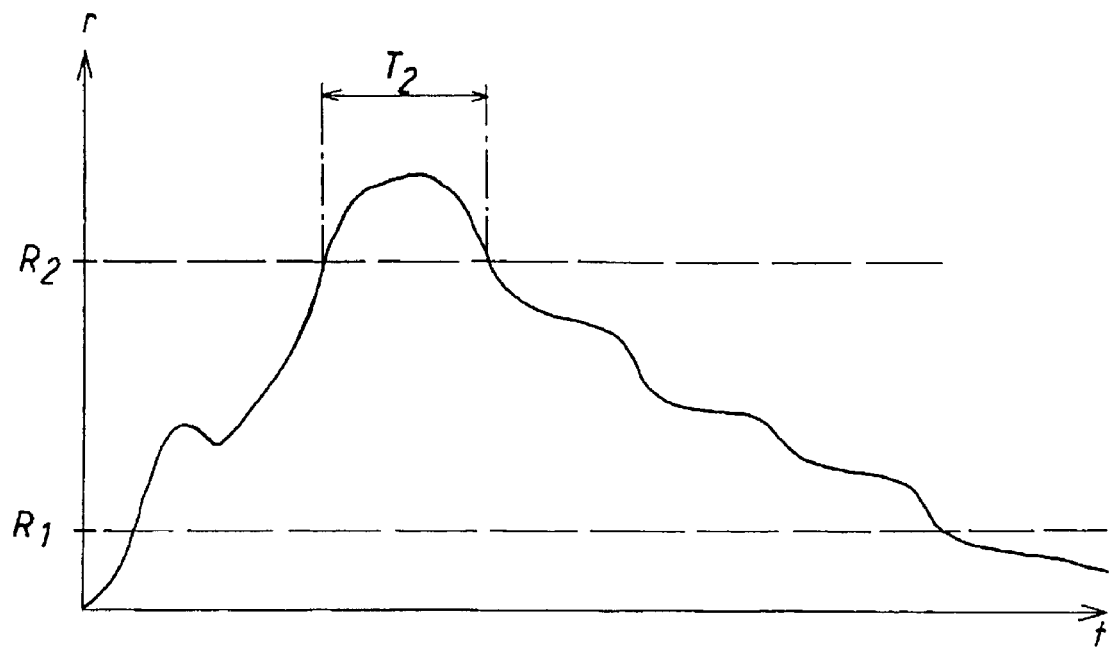
FIGS. 3a and 3b graphically illustrate possible acceleration curves during a collision process.
Figure 3B:
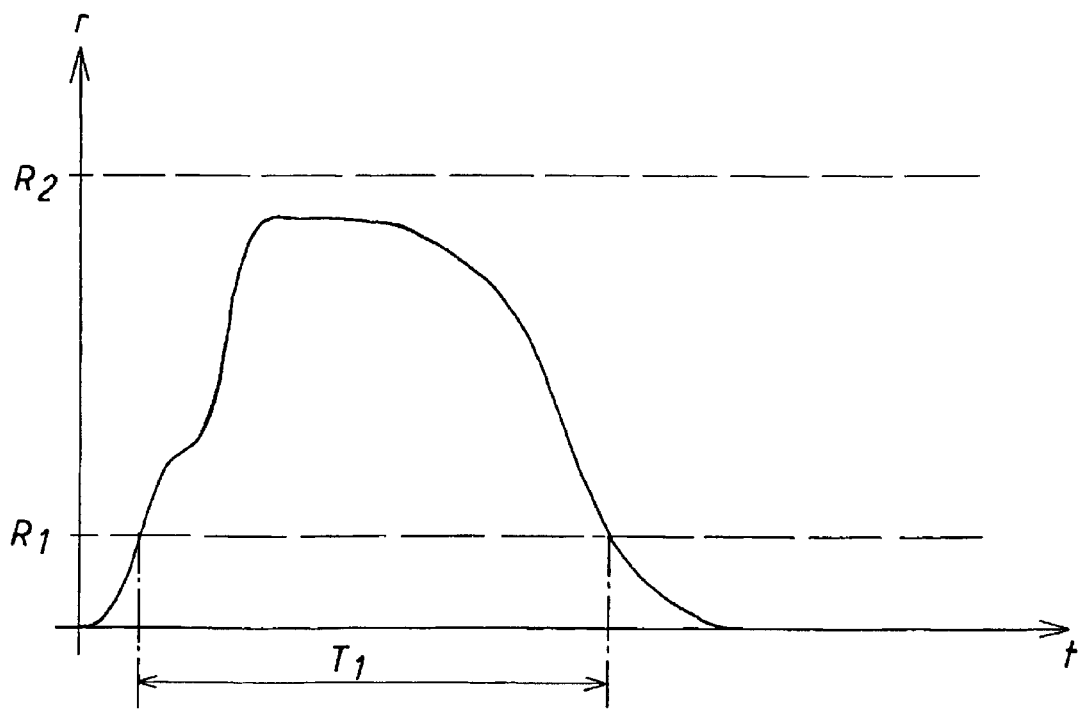

FIGS. 3a and 3b show a vehicle's retardation, r, as function of the time in two different imaginary processes, measured by the accelerometer 210 in the ECU in FIG. 2. If the amount of the vehicle's retardation, r, exceeds a certain upper value $R_2$ during a certain time period $T_2$, the airbag will trigger. In order to enable a subsequent evaluation of the process where the airbag has triggered, certain selected parameters will begin to be stored as soon as the amount of the retardation exceeds a second, lower limit $R_1$. In other words, when the retardation exceeds the lower limit $R_1$, the various parameters will begin to be stored in the memory MEM 1, which suitably is a so-called volatile memory.

As mentioned, the airbag will trigger if the retardation during the time period $T_2$ exceeds the upper limit $R_2$, and the parameters that have been stored in MEM 1 will be transmitted to MEM 2, which is a non-volatile memory, for example a so-called EEPROM. The transmission of the parameters to a non-volatile memory results in that the process can be evaluated subsequently.

However, the invention also provides a subsequent evaluation of processes where the airbag has not triggered, which is due to the fact that the parameters that are stored in MEM 1 are transmitted to MEM 2 if certain conditions are fulfilled. In principle, the conditions can be selected freely, but in a preferred embodiment, the parameters from MEM 1 are transmitted to MEM 2 when the amount of data that have been stored in MEM 1 exceeds a certain limit. As an example, this condition can be when MEM 1 is full, and if the amount of the retardation has exceeded the lower limit $R_1$ during a certain predetermined time period $T_1$. The transmission of data between memories, and the control of whether the condition for the transmission is satisfied, is suitably handled by the processor in the control unit.

This makes it possible to evaluate processes of the type which is shown in FIG. 3b, in other words processes where the retardation exceeds the lower limit $T_1$ where data begins to be stored in the volatile memory, but where the retardation never becomes so large that the upper limit $T_2$ is exceeded, and the airbag is triggered. Such processes can be necessary to store and evaluate for a number of different reasons, for example, on the basis of such an evaluation, it may perhaps be possible to come to the conclusion that the criterion or criteria for when the airbag shall trigger ought to be changed. Another possible reason for making such an evaluation is to make it possible to explain to the vehicle's driver why the airbag has not triggered.

Thus, the evaluation of a process where an airbag or some other safety device in a vehicle has not triggered is made possible by means of the invention without the need of taking up any additional space in the vehicle, which is due to the fact that the invention in principle can be realized in an existing ECU of the type which is shown in FIG. 2. Moreover, the fact that, in principle, existing components are used in order to realize the invention results in that the cost for a device according to the invention can be kept low.

It is possible that a vehicle can first be involved in a situation where the airbag is nearly triggered, and then be involved in a situation where the airbag is triggered. The memories, MEM 1 and MEM 2, are dimensioned in such manner that they are capable of storing data for a process of typically approximately 50–100 milliseconds, which results in that data from a first process will be "written over" by data from a second process. In order to make sure that data from the process that is considered to be the most important is stored, the following logic during writing in the memories can be applied: If data from a process where the airbag has not triggered have been stored in the non-volatile memory, MEM 2, the non-volatile memory will be open for continuous storage of data, which results in that data from a later situation where the airbag is triggered is stored in the non-volatile memory. Inversely, the non-volatile memory will on the other hand be "locked" against writing of new data if the airbag has triggered, which results in that these data will be stored for subsequent analysis. Obviously, the reverse can be applied, if data from situations where the airbag is not triggered are considered to be more important than situations where it is triggered.

The following are examples of the other parameters which are measured according to what is shown in FIG. 2: the year, month and day for the start of the process, and the point of time for the process comprising hour and minute, the maximum measured acceleration during the process and the point of time for the maximum measured acceleration during the process.

The invention is not limited to the embodiments which are described above and shown in the drawings, but may be varied within the scope of the appended patent claims. For example, the invention can be applied to other types of safety devices than airbags, and other types of sensors than accelerometers can be used for releasing the safety device. The memories that are used can also be in principle optional types of memories.

What is claimed is:

1. An arrangement for conducting subsequent analysis of processes and occurrences in a motor vehicle (110) wherein a safety device has not triggered, said arrangement comprising:

a control device (200), a sensor (210) for detection of processes which can result in the safety device being triggered if a first parameter (r) exceeds an upper limit ($R_2$), a first memory (MEM 1) in which parameters (r, $P_1$ ... $P_N$) regarding the operation of the vehicle are stored when said first parameter (r) exceeds a lower limit ($R_1$), and a second memory (MEM 2) to which said parameters are transmitted if the safety device is triggered; and means (CPU) for transmitting said parameters from the first memory (MEM 1) to the second memory (MEM 2) if the first parameter (r) exceeds the lower limit ($R_1$) during a certain time period ($T_1$) and the amount of data in the first memory exceeds a predetermined limit.

2. The arrangement as recited in claim 1, wherein the first memory is a volatile memory and the second memory is a non-volatile memory.

3. The arrangement as recited in claim 1, wherein the safety device is an airbag.

4. The arrangement as recited in claim 3, wherein the sensor is an accelerometer.

5. A method for conducting subsequent analysis of processes in a motor vehicle (110) where a safety device in the vehicle has not triggered, said method comprising: controlling the safety device and detecting processes or occurrences that can result in the safety device being triggered if a first parameter (r) exceeds an upper limit ($R_2$), a first storage (MEM 1) of parameters (r, $P_1 \ldots P_N$) regarding the operation of the vehicle when said first parameter (r) exceeds a lower limit ($R_1$), and a second storage (MEM 2) to which said parameters are transmitted if the safety device is triggered; and transmitting said parameters from the first storage (MEM 1) to the second storage (MEM 2) if the first parameter (r) exceeds the lower limit ($R_1$) during a certain time period ($T_1$) and the amount of data in the first storage exceeds a certain limit.

6. The method as recited in claim 5, wherein the first storage takes place in a volatile memory and the second storage takes place in a non-volatile memory.

7. The method as recited in claim 5, wherein the safety device is an airbag.

8. The method as recited in claim 7, wherein the detection of the first parameter takes place by means of an accelerometer.

* * * * *